United States Patent Office 3,752,812
Patented Aug. 14, 1973

3,752,812
2-TRIFLUOROMETHYLQUINOXALINE-
DI-N-OXIDES
Elie Abushanab, East Lyme, Conn., assignor to Pfizer
Inc., New York, N.Y.
No Drawing. Filed Feb. 5, 1970, Ser. No. 9,041
Int. Cl. C07d 51/78
U.S. Cl. 260—250 R    14 Claims

ABSTRACT OF THE DISCLOSURE

Novel 2 - trifluoromethyl - 3 - substitutedquinoxaline-di - N - oxides and 2 - trifluoroacetyl - 3 - substituted-quinoxaline - di - oxides having the formulae

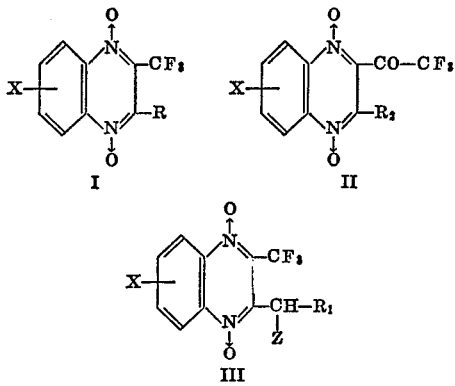

wherein

X is a 6- or a 7-position substituent and is hydrogen, chloro, fluoro, methyl, methoxy, trifluoromethyl, sulfonamido, N-methylsulfonamido and N,N-dimethylsulfonamido;

Z is hydrogen, carboxy, carbo(lower alkoxy), carbamyl, chloro, fluoro, bromo, (lower alkyl)thio, (lower alkyl)sulfinyl, (lower alkyl)sulfonyl, hydroxy, lower alkoxy, lower alkanoyloxy, amino, mono(lower alkyl)-amino, di(lower alkyl)amino, trimethylammonium and nitro-oxy;

$R_1$ is hydrogen and lower alkyl;

R is hydrogen, carbo(lower alkoxy), carbamyl, chloro, bromo, fluoro, cyano, lower alkoxy, (lower alkyl)thio, (lower alkyl)sulfinyl, (lower alkyl)sulfonyl, amino, mono (lower alkyl)amino, di(lower alkyl)amino, $\omega,\omega,\omega$-trifluoro(lower alkyl), trifluoroacetyl, phenyl, cycloalkyl, di(lower alkyl)aminoethyl, —CO—$R_2$, formyl and —CH=N—$R_5$ wherein $R_5$ is

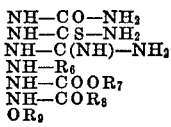

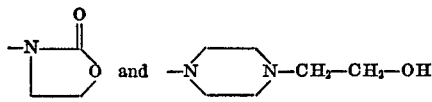

wherein $R_6$ is lower alkyl, benzyl and hydroxy alkyl containing from 2 to 4 carbon atoms;

$R_7$ is lower alkyl and hydroxy alkyl containing from 2 to 4 carbon atoms;

$R_8$ is lower alkyl and phenyl; and $R_9$ is hydrogen and lower alkyl; and $R_2$ is lower alkyl, phenyl, 2-furyl, 2-pyrryl, 2-thienyl, 2,5-dimethyl-3-thienyl and 5-substituted-2-thienyl wherein the substituent is methyl, chloro, bromo and iodo;

The non-toxic acid addition salts of those compounds wherein Z and R are amino, mono(lower alkyl)amino and di(lower alkyl)amino; and the sodium and potassium salts of those compounds wherein Z is carboxy; and methods for their preparation are described. The compounds are useful as antibacterial agents. Many of them are also useful as animal growth promotants.

BACKGROUND OF THE INVENTION

This invention relates to novel 2-trifluoromethyl-3-substitutedquinoxaline-di-N-oxides and 2-trifluoroacetyl-3-substitutedquinoxaline-di-N-oxides which are useful antibacterial agents for the control of various pathogenic micro-organisms or as animal growth promotants.

The intensive, never-ending search for antibacterial agents has led to the development of a wide variety of structural types of organic compounds, including numerous derivatives of quinoxaline-di-N-oxides. Landquist et al., J. Chem. Soc. 2052 (1956), in a search for compounds of improved antibacterial or antiprotozoal activity, reported the preparation of several derivatives of 2-methyl- and 2,3-dimethyl-quinoxaline-di-N-oxides in which the methyl groups were converted to groups such as bromomethyl-, acetoxymethyl- and hydroxymethyl. However, no utility is alleged for any of these compounds. French Pat. M3717, granted Jan. 3, 1966, generically discloses 2-quinoxalinecarboxamide-di-N-oxides in which the carboxamide group may be substituted with an alkyl, substituted alkyl, aryl, cycloalkyl, aralkyl, or cycloalkylalkyl group; or may form a heterocyclic amide, e.g., a piperidide. They are reported to be of use in human therapy as antitubercular, antibacterial, anticancer, antivirus and antiprotozoal agents.

Belgian Pat. 697,976, granted Nov. 3, 1967, describes a variety of N-substituted derivatives of 3-methyl-2-quinoxalinecarboxamide-di-N-oxide in which the N-substituent is phenyl, substituted phenyl, dodecyl, or ethyl. Also disclosed are cyclic amides, e.g., pyrrolidide and piperidide. They are said to be of value as intermediates for the preparation of vegetation protection agents and pharmaceutical agents. Belgian Pats. 721,724; 721,725; 721,726; 721,727 and 721,728; published Apr. 2, 1969, describe a variety of N-substituted 3-methyl-2-quinoxalinecarboxamide-di-N-oxide derivatives wherein the N-substituent is a hydroxyalkyl, lower alkoxyalkyl, carbalkoxyalkyl, monoalkylaminoalkyl or di(alkyl)aminoalkyl group as antibacterial agents.

SUMMARY OF THE INVENTION

It has now been found that novel 2-trifluoromethyl-(3-substituted)quinoxaline-di-N-oxides and 2-trifluoroacetyl-(3-substituted)quinoxaline-di-N-oxides having Formulae I through III below exhibit significant in vitro antibacterial activity:

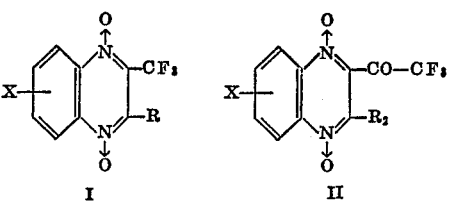

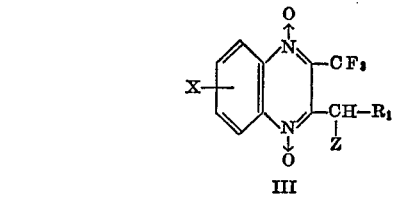

wherein

X is a 6- or a 7-position substituent and is selected from the group consisting of hydrogen, methyl, methoxy, chloro, fluoro, trifluoromethyl, sulfonamido, N-methylsulfonamido and N,N-dimethylsulfonamido;

Z is selected from the group consisting of hydrogen, carboxy, carbo(lower alkoxy), carbamyl, chloro, fluoro, bromo, (lower alkyl)thio, (lower alkyl)sulfinyl, (lower alkyl)sulfonyl, hydroxy, lower alkoxy, lower alkanoyloxy, amino, mono(lower alkyl)amino, di(lower alkyl)amino, trimethyl-ammonium and nitro-oxy;

$R_1$ is selected from the group consisting of hydrogen and lower alkyl;

R is selected from the group consisting of hydrogen, carbo(lower alkoxy), carbamyl, chloro, bromo, fluoro, cyano, lower alkoxy, (lower alkyl)thio, (lower alkyl)sulfinyl, (lower alkyl)sulfonyl, amino, mono(lower alkyl)amino, di(lower alkyl)amino, $\omega,\omega,\omega$-trifluoro(lower alkyl), trifluoroacetyl, phenyl, cycloalkyl, di(lower alkyl) aminoethyl, —CO—$R_2$, formyl and —CH=N—$R_5$ wherein $R_5$ is selected from the group consisting of

NH—CO—$NH_2$
NH—CS—$NH_2$
NH—C(NH)—$NH_2$
NH—$R_6$
NH—COO$R_7$
NH—CO$R_8$
O$R_9$

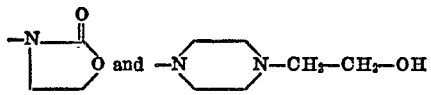

wherein $R_6$ is selected from the group consisting of lower alkyl, benzyl and hydroxyl alkyl containing from 2 to 4 carbon atoms;

$R_7$ is selected from the group consisting of lower alkyl and hydroxy alkyl containing from 2 to 4 carbon atoms;

$R_8$ is selected from the group consisting of lower alkyl and phenyl; and $R_9$ is selected from the group consisting of hydrogen and lower alkyl; and $R_2$ is selected from the group consisting of lower alkyl, phenyl, 2-furyl, 2-pyrryl, 2-thienyl, 2,5-dimethyl-3-thienyl and 5-substituted-2-thienyl wherein the substituent is selected from the group consisting of methyl, chloro, bromo, and iodo;

The non-toxic acid addition salts of those compounds of Formulae I and III wherein Z and R are each selected from the group consisting of amino, mono(lower alkyl)amino and di(lower alkyl)amino; and the sodium and potassium salts of those compounds of Formula III wherein Z is carboxy.

By the terms lower alkyl, lower alkoxy and lower alkanoyloxy is meant those alkyl, alkoxy and alkanoyloxy groups containing from 1 to 4 carbon atoms since they are conveniently prepared from readily available starting materials.

The compounds of this invention are effective broad spectrum antibacterials in vitro. Further, many of the compounds described hereinn are also effective broad spectrum and antibacterials in vivo. Such broad spectrum activity is in contrast to the gram-negative activity exhibited by currently available quinoxaline-di-N-oxides. Additionally, several of the herein described compounds are effective animal growth promotants, particularly for swine and poultry.

The substituents on the fused benzene moiety of the 2-trifluoromethyl - 3 - substitutedquinoxaline-di-N-oxide compound can vary widely. For example, at least one of the following substituents can be present: hydrogen, lower alkyl, lower alkoxy, chloro, bromo, fluoro, trifluoromethyl, di(lower alkyl)amino, amino, carboxy, carbamyl, carbo-(lower alkoxy), lower alkylmercapto, lower alkylsulfoxy, lower alkylsulfonyl, sulfonamido and N,N-di(loweralkyl) sulfonamido. The favored positions on the fused benzene ring are the 6- and the 7-positions. Of special interest for these positions are at least one of the following substituents: hydrogen, methyl, chloro, fluoro and methoxy. A single substituent, that is, a 6- or a 7-substituent, is usually held in greater favor than is a 6,7-disubstituted derivative for reasons of economy as regards the reactants used. The preferred substitutents, for reasons of economy and/or their favorable effect upon activity, are hydrogen, chloro and fluoro. Nitro, hydroxy and mercapto groups are not desirable substituents since they react with difficulty in the preefrred process for making these novel compounds and/or formation of undesired products and poor yields.

Unique among the compounds of this invention by reason of their outstanding broad spectrum activity and/or significant growth promoting activity in swine are those compounds of Formula I wherein R is methyl and X is hydrogen or chloro.

DETAILED SUMMARY OF THE INVENTION

The novel compounds of this invention, or the precursors therefor, are conveniently prepared by reaction, in the presence of a base, of the appropriate benzofuroxan with a trifluoromethyl compound having a methylene group activated by one or two electron-withdrawing groups, said compounds having the formulae:

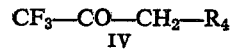
IV

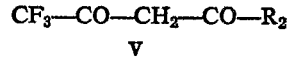
V

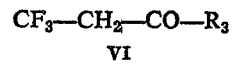
VI wherein $R_4$ is selected from the group consisting of carbamyl, carbo(lower alkoxy), hydroxy(lower alkyl), trifluoroacetyl, phenyl, cycloalkyl, lower alkyl, (lower alkyl)thio, lower alkoxy, di(lower alkyl)amino, $\omega,\omega,\omega$-trifluoro(lower)alkyl; and —CH(Z)$R'_4$ wherein Z is carbo(lower alkoxy), carboxy, and carbamyl; and $R'_4$ is lower alkyl;

$R_2$ is selected from the group consisting of phenyl, lower alkyl, 2-thienyl, 2,5-dimethyl-3-thienyl, 2-furyl, 2-pyrryl and 5-substituted-2-thienyl wherein the substituent is selected from the group consisting of methyl, chloro, bromo and iodo;

$R_3$ is selected from the group consisting of lower alkyl and phenyl.

Compounds of Formula V react with benzofuroxans to give the isomeric products II and IIA:

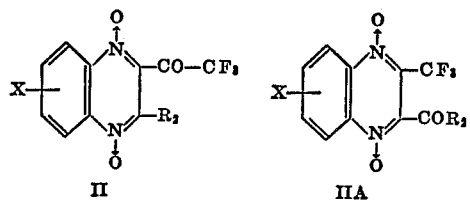

II  IIA

The degree to which a given reaction occurs, that is whether the predominant reaction involves the carbonyl group adjacent to the trifluoromethyl group or that adjacent to the $R_2$ substituent appears to depend upon the nature of the $R_2$ substituent. When $R_2$ is lower alkyl or phenyl, products of Formula IIA predominate; and when $R_2$ is 2-thienyl and other groups as defined above, products of Formula II predominate. The products of Formula II appear to be susceptible to hydrolysis with removal of the trifluoroacetyl group as evidenced by isolation of the corresponding 2-des(trifluoroacetyl)-3-$R_2$-substitutedquinoxaline-di-N-oxide. Of course, when product II is the major product of a given reaction, the hydrolysis reaction reduces the yield of the desired II product. This side reaction can be minimized by avoiding prolonged reaction periods, unduly elevated temperatures and large excesses of base. A similar hydrolysis reaction is, of course, possible with the acyl group of Formula IIA compounds. However, such reaction appears to occur to only a slight extent.

The reaction is usually conducted in an appropriate solvent system, that is, a reaction-inert solvent or mixture of solvents, which serves to dissolve at least the reactants and which does not enter into adverse reactions with the reactants or products. Suitable solvents are ethers such as diethylether, diisopropylether, dioxane, tetrahydrofuran, dimethylethers of ethyleneglycol and diethyleneglycol; alcohols especially the lower molecular weight alcohols having up to four carbon atoms; N,N-dimethylformamide, organic amines, benzene, toluene, xylene, acetonitrile, halogenated hydrocarbons such as chloroform, methylene chloride and mixtures of these solvents.

The reaction is normally conducted over the temperature range of from about 0° C. to about 100° C. and preferably from about 30° C. to about 100° C. Higher temperatures can be used but appear to offer no advantage and may in certain cases cause decomposition. The reaction period, as expected, depends not only upon the temperature, but also upon the reactants and particularly upon the base used. For a given set of reactants, the higher the reaction temperature, the shorter the reaction period; the lower the reaction temperature, the longer the reaction period. In general, the reaction is conducted in a solvent system at reflux temperature for a period of up to four hours followed by standing at room temperature for several hours, e.g., overnight.

A wide variety of bases are operative in the benzofuroxan-trifluoromethyl-ketone process of this invention such as, for example, organic amines, ammonia, alkali metal hydroxides, alkali metal hydrides and alkali metal alkoxides. Representative of such bases are ammonia, primary amines such as n-propylamine, n-butylamine, aniline, cyclohexylamine, benzylamine, p-toluidine, ethylamine, octylamine; secondary amines such as diethylamine, dipropylamine, methyl-n-butylamine, pyrrolidine, morpholine, piperidine, pyrrole, pyrroline, N-methylaniline, N-methylbenzylamine, pyrimidine; tertiary amines such as triethylamine, trimethylamine, N,N-dimethylaniline, N-methylpyrrolidine, 1,2-dimethyl-1,4,5,6-tetrahydropyrimidine, N-methylmorpholine and 1,5-diazobicyclo[4,3,0]-5-nonene; sodium hydroxide, potassium hydroxide, ammonium hydroxide, sodium ethoxide, potassium methoxide, sodium hydroxide and sodium hydride. The preferred bases are the alkali metal alkoxides since they tend to minimize the reaction period relative to that required by other bases and are productive of satisfactory yields of the desired product.

The base itself, if liquid at the reaction temperature, can also be used as solvent. This provision, as those skilled in the art will recognize, limits the use of bases as solvents to organic amines and ammonium hydroxide.

The amount of base required is not critical but can vary widely, e.g., from a trace or catalytic amount of base, that is, from about 0.001 percent by weight, based on the benzofuroxan reactant present, to even molar excess amounts as occurs when the base is used as solvent. In general, optimum amounts range from about 0.1 percent by weight to about equimolar amounts based on the benzofuroxan used. As will be readily appreciated, the optimum proportion of base will vary with the nature of the particular reactants employed, as well as specific reaction conditions. Accordingly, the optimum proportion of base is most conveniently established by routine experimentation using small scale laboratory reactions.

The molar ratio of reactants, that is, of the benzofuroxan and the methylene-activated reactant, is not critical but can vary widely, e.g., from equimolar proportions to a large excess of either reactant. They are in general, reacted in equimolar proportions. As a practical measure when using a readily available methylene-activated reactant, e.g., trifluoro acetone, a large excess of the reagent is used to ensure as complete a conversion of the benzofuroxan to the desired product as is possible. Further, the excess methylene-activated reactant can also serve as solvent.

The order of addition of reactants is not critical to the success of this process. They can be added all at once along with the base or the base can be added to a mixture of the benzofuroxan and methylene-activated reactant. This latter method is advantageous in the case of exothermic reactions since it facilitates temperature control apparently by regulating the rate of reaction. In the case of such exothermic reactions, the use of an appropriate solvent also contributes to temperature control. As alternatives to the above methods of addition of reactants, either reactant can be added to the other in the presence of the proper base, or the reactants can be added simultaneously to the base.

This method produces both the 6- and 7-isomers of those compounds wherein X is other than hydrogen because of the existence of a dynamic, tautomeric equilibrium in the X-substituted benzofuroxan. The isomers actually a mixture of isomers are recovered by methods known to those skilled in the art. In many of the preparations disclosed herein a solid, often crystalline material, separates from the reaction mixture. The solid appears to consist predominantly of one of the isomers, which isomer can be purified by repeated recrystallization from a suitable solvent to a constant melting point. The other isomer, the one present in smaller amounts in the solid material, is the predominant product in the mother liquor. It can be recovered therefrom by methods known to those skilled in the art, as, for example, by evaporation of the mother liquor and repeated crystallization of the residue to a product of constant melting point. Alternatively, the reaction mixture can be extracted with a suitable solvent, either before or after evaporation to dryness, and the extracted material which contains both isomers purified further by recrystallization.

The identification of the isomers has not been completed. Both isomers of a given compound, however, exhibit the same type of activity, e.g., as animal growth promotants or as antibacterial agents, to a significant degree.

Alternatively, the benzofuroxan reactant can be reacted with a preformed enamine of the appropriate trifluoromethyl ketone reactant, such as the morpholino derivative of 1,1,1-trifluoro-2-butanone, according to the procedure set forth in U.S. Pat. 3,398,141. A summary of the preparation of enamines is given by Szmuskovicz, "Advances in Organic Chemistry," 4, 1–113, Interscience Publishers, New York (1963). The enamine reactants are most conveniently prepared by the reaction of a ketone with a secondary amine.

Compounds of Formula I wherein R is chloro, bromo, fluoro, (lower alkyl)sulfinyl or (lower alkyl)sulfonyl are prepared from compounds of Formula I wherein R is (lower alkyl)thio by methods described below. The requisite 2-trifluoromethyl-3-(lower alkyl)thio quinoxaline-di-N-oxides are prepared by reacting the appropriate trifluoromethyl(lower alkyl)ketone with a benzofuroxan as is described herein. The 2-trifluoromethyl-3-(lower alkyl)thio quinoxaline-di-N-oxides are oxidized by means of sodium periodate, potassium permanganate, hydrogen peroxide or an organic peracid such as perbenzoic acid, m-chloroperbenzoic and peracetic acid, to the corresponding 2-trifluoromethyl-3-(lower alkyl)sulfinylquinoxaline-di-N-oxides. The reaction is conducted with equimolar quantities of reactants in a suitable reaction-inert solvent, such as water and chloroform at a temperature of from about 20° C. to the boiling point of the solvent used. The use of greater than equimolar quantities of reactants produces the corresponding 2-trifluoromethyl-3-(lower alkyl)sulfonylquinoxaline-di-N-oxides.

The 2-trifluoromethyl-3-(lower alkyl)sulfinylquinoxaline-di-N-oxides or the corresponding sulfonyl compounds are then converted to 2-trifluoromethyl-3-halo (Cl, Br, F)quinoxaline-di-N-oxides by a rearrangement reaction which comprises treating the sulfinyl or sulfonyl derivative with a concentrated acid such as hydrogen chloride, hydrogen bromide, hydrogen fluoride, at a temperature of from about 25° C. to about 100° C. The amount of hydrogen halide used is not critical. It can vary from catalytic amounts, e.g., from about 0.001 percent by weight based on the sulfinyl or sulfonyl compound to large excesses. It is preferred, however, to use from about 2 to about 10 molar excess of the hydrogen halide. Additionally, the N-haloimides, e.g., N-bromosuccinimide, N-chlorosuccinimide, bring about the same rearrangement of the sulfinyl compounds to the corresponding halo compounds. The 2-trifluoromethyl-3-haloquinoxaline-di-N-oxides serve as precursors for compounds of Formula I wherein R is cyano, amino, mono (lower alkyl)amino, di(lower alkyl)amino or lower alkoxy for which the starting ketones of Formulae IV through VI are not available or not available with ease.

The general non-availability of reactants of Formulae IV through VI wherein $R_2$, $R_4$ and $R_3$ are groups other than those defined above, makes it more convenient to prepare products of Formula III utilizing simpler compounds of Formula III wherein Z is hydrogen and $R_1$ is hydrogen or lower alkyl as reactants. Such 2-trifluoromethyl-3-lower alkyl quinoxaline-di-N-oxides, readily accessible by reaction of the appropriate trifluoromethyl (lower alkyl)ketone with a benzofuroxan as described above, are converted to the corresponding 2-trifluoromethyl-3-α-haloalkyl(Br, Cl, F)quinoxaline-di-N-oxides by known methods.

The bromo substituted lower alkyl compounds of Formula III (Z=Br, $R_1$=H, lower alkyl) are prepared, for example by direct bromination of the corresponding lower alkyl compounds according to known procedures. A convenient method comprises mixing equimolar proportions of the 2-trifluoromethyl-3-lower alkyl substituted-quinoxaline-di-N-oxide and bromine in chloroform, refluxing the mixture for a brief period, e.g., one-half hour, and allowing it to stand for several hours at room temperature. The product is isolated by column chromatography on Florisil (an activated magnesium silicate available from the Floridin Co.) and elution with 25 percent chloroformbenzene. The analogous chloro compounds are prepared in the same manner substituting chlorine for bromine. The fluoro analogs are produced by metathesis of the corrresponding bromo or chloro compounds with an inorganic fluoride, e.g., mercuric fluoride, antimony fluroide. The 2-trifluoromethyl-3-α-haloalkylquinoxaline-di-N-oxides serve as precursors for introduction of all other values, either directly or indirectly, of Z by standard procedures and as exemplified herein. Such groups as cyano, amino, mono(lower alkyl)amino, di(lower alkyl)amino, trimethylammonium, hydroxy, lower alkoxy, lower alkanoyloxy and nitro-oxy readily replace the halo group. The cyano compounds thus produced can be converted to the corresponding carboxy, carbo(lower alkoxy) and carbamyl derivatives. The hydroxy compounds can serve as reactants for preparation of the corresponding lower alkanoyloxy compounds. The trimethylammonium compounds serve as convenient starting point for introduction of the (lower alkyl)thio groups which in turn are oxidized to the corresponding sulfoxides and sulfones.

The valuable compounds of this invention wherein R is CH=N—$R_5$ are readily prepared by methods well-known in the art. The most convenient method from the standpoint of availability of materials, ease and simplicity of reaction, yield and purity of product, is the condensation of the appropriate 2-trifluoromethyl-3-lower alkanoyl quinoxaline-di-N-oxide with the proper amino derivative, $H_2N$—$R_5$ wherein $R_5$ is as defined above.

The process comprises, in general, the reaction of the 2-trifluoromethyl - 3-lower alkanoyl quinoxaline-di-N-oxide and the amino derivative of choice in a suitable solvent system such as acetic acid, ether and lower alcohols, especially methyl and ethyl alcohols at a temperature of from about room temperature to the reflux temperature of the solvent. The addition of a small amount of an acid such as hydrochloric or acetic frequently serves to accelerate the reaction and improve the yield. The amine derivative can be used in the form of an acid addition salt, e.g., the hydrochloride, sulfate, acetate. In such a case an aqueous solution of the amine derivative to which the requisite amount of alkali, alkali bicarbonate or carbonate or an excess of alkali acetate is added is generally used. In many cases, as for example, when using semicarbazide, a concentrated aqueous solution of the semicarbazide hydrochloride is added to an alcohol or acetic acid solution of the aldehyde to give the desired semicarbazone. Potassium acetate is added to complete formation of the product.

The reaction may occur almost immediately or may require periods of up to several days depending upon the reactants and reaction conditions. In most instances, however, reaction is complete in less than four hours.

The products are yellow crystalline substances for the most part which precipitate from the reaction mixture. They are collected by suitable means and dried.

The valuable products of this invention are remarkably effecitve in treating a wide variety of pathogenic microorganisms. They are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a pharmaceutically-acceptable carrier such as vegetable or mineral oil or an emollient cream. Similarly, they may be dissolved or dispersed in liquid carriers or solvents such as water, alcohol, glycols or mixtures thereof or other pharmaceutically-acceptable inert media, that is, media which have no harmful effect on the active ingredient. For such purposes, it will generally be acceptable to employ concentrations of active ingredients of from about 0.01 percent to about 10 percent by weight based on total composition.

Further, many of the compounds described herein exhibit broad spectrum activity, that is activity against both gram-negative and gram-positive bacteria, such as *Staphylococcus aureus, Streptomyces pyogenes, Escherichia coli, Pasteurella multocida* and *Shigella sonnei*. This is in contrast to the usual gram-negative activity of quinoxaline-di-N-oxides. Additionally, many of them are active in vivo and are especially useful as animal growth promotants, especially for swine and poultry.

When used in vivo for such purposes, these novel compounds can be administered orally or parenterally, e.g., by subcutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, non-toxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

Other methods include mixing with animal feeds, the preparation of feed concentrates and supplements and dilute solutions or suspensions, e.g., a 0.1 percent solution, for drinking purposes. The addition of a low level of one or more of the herein described 2-trifluoromethyl-3-substituted-quinoxaline-di-N-oxides (Formulae I, IIA) or the analogous compounds of Formula II, to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers, including the following: soybean oil meal, corn gluten meal, cotton seed oil meal, sunflower seed meal, linseed oil meal, cornmeal, limestone and corncob meal can be employed. The carrier facilitates uniform distribution of the active materials in the finished feed with which the concentrate is blended. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well-known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are given solely for the purpose of illustration.

EXAMPLE I 2-methyl-3-trifluoromethylquinoxaline-di-N-oxide (A) Sodium metal pellets (0.187 g., 0.0085 mole) are dissolved in ethanol (35 ml.) and the resulting solution cooled to room temperature. Benzofuroxan (4.5 g., 0.034 mole) and 1,1,1-trifluoro-2-butanone (4.3 g., 0.034 mole) are added and the mixture refluxed for two hours then allowed to stand overnight at room temperature. The reaction mixture is evaporated to dryness, the residue taken up in benzene and chromatographed on an acid washed Florisil column.

The column is eluted first with benzene which permits recovery of 3.19 of unreated benzofuroxan and then with chloroform. Evaporation of the chloroform eluate yields a gum (1.28 g.) which crystallizes from ether; M.P. 126–128° C. Further recrystallization raises the melting point to 135–135.5° C.

Analysis.—Calc'd for $C_{10}H_7N_2O_2F_3$ (percent): C, 49.18; H, 2.87; N, 11.47. Found (percent): C, 48.99; H, 2.99; N, 11.52.

A mixture of thiophene-free benzene (300 ml.) pyrrolidine (4 mole equivalents) and 1,1,1-trifluoro-2-butanone (0.05 mole) is heated at reflux until one mole equivalent of water is collected in a Bidwell-Sterling moisture trap placed between the reaction flask and the condenser. The mixture is then evaporated to dryness in vacuo, care being taken to exclude moisture. The residue is triturated with methanol, cooled and filtered.

The enamine derivative is then added to a solution of benzofuroxan (0.05 mole) in methanol (100 ml.) at 30° C., mixture stirred for one hour then taken to dryness in vacuo. The product is recrystallized from ether.

EXAMPLE II 2-acetyl-3-trifluoromethylquinoxaline-di-N-oxide

Sodium metal pellets (0.29 g., 0.013 mole) are dissolved in ethanol (50 ml.) and the resulting solution cooled to room temperature. Benzofuroxan (6.8 g., 0.05 mole) and trifluoroacetylacetone (7.71 g., 0.05 mole) are added, the mixture refluxed for two hours then allowed to stand at room temperature overnight. The yellow solid is removed by filtration and washed with cold ethanol; (1.46 g.), M.P. 150–152° C. Crystallization from ethanol raises the melting point to 152–153° C.

Analysis.—Calc'd for $C_{11}H_7N_2O_3F_3$ (percent): C, 48.57; H, 2.59; N, 10.30. Found (percent): C, 48.20; H, 2.65; N, 10.10.

EXAMPLE III

The following 2-trifluoromethyl-3-substituted-quinoxaline-di-N-oxides are prepared by the procedures of Examples I and II. The product, in instances where one precipitates from the reaction mixture, is removed by filtration and purified by crystallization from an appropriate solvent. The mother liquor is evaporated to dryness and the residue recrystallized from a suitable solvent to recover all isomers. When no product precipitates from the reaction mixture, the mixture is evaporated to dryness.

The crude product thus obtained is purified by column chromatography on acid washed Florisil. The procedure comprises taking the crude product up in benzene, adsorbing the product on the Florisil column, and eluting the column with benzene to recover unreacted benzofuroxan followed by chloroform. The chloroform eluate is evaporated to dryness and the residue crystallized from a suitable solvent.

| X | R |
|---|---|
| H | H |
| H | $COOC_2H_5$ |
| H | $C_2H_5$ |
| Cl | H |
| Cl | $COCH_3$ |
| $OCH_3$ | H |
| $OCH_3$ | $COCH_3$ |
| $SO_2NH_2$ | $COOC_2H_5$ |
| $SO_2N(CH_3)_2$ | $COCH_3$ |

EXAMPLE IV

The following 2-trifluoromethyl-3-quinoxaline-di-N-oxides are prepared according to Example III from the appropriate benzofuroxan and a trifluoromethyl compound of the formula $CF_3—CO—CH_2—R$:

| X | R | X | R | X | R |
|---|---|---|---|---|---|
| H | $CO—CF_3$ | $CH_3$ | $CF_3$ | $SO_2NH_2$ | $COO(n-C_4H_9)$ |
| Cl | $CH_3$ | $SO_2N(CH_3)_2$ | $CF_3$ | $SO_2NH(CH_3)$ | $COO(n-C_4H_9)$ |
| F | $CH_3$ | Cl | $COCF_3$ | H | $C_6H_5$ |
| $OCH_3$ | $CH_3$ | F | $COCF_3$ | Cl | $C_6H_5$ |
| $CH_3$ | $CH_3$ | $OCH_3$ | $COCF_3$ | F | $C_6H_5$ |
| $CF_3$ | $CH_3$ | $SO_2NH_2$ | $COCF_3$ | $CF_3$ | $C_6H_5$ |
| $SO_2NH_2$ | $CH_3$ | $CF_3$ | $COCF_3$ | $CH_3$ | $C_6H_5$ |
| $SO_2NH—CH_3$ | $CH_3$ | $CH_3$ | $COCH_3$ | $OCH_3$ | $C_6H_5$ |
| $SO_2N(CH_3)_2$ | $CH_3$ | F | $COCH_3$ | $SO_2NH_2$ | $C_6H_5$ |
| H | $n-C_4H_9$ | $CF_3$ | $COCH_3$ | $SO_2N(CH_3)_2$ | $C_6H_5$ |
| Cl | $n-C_4H_9$ | $SO_2NH(CH_3)$ | $COCH_3$ | H | $CH_2CH_2N(C_2H_5)_2$ |
| F | $n-C_4H_9$ | Cl | $COOC_2H_5$ | Cl | $CH_2CH_2N(C_2H_5)_2$ |
| $OCH_3$ | $n-C_4H_9$ | F | $COOC_2H_5$ | F | $CH_2CH_2N(C_2H_5)_2$ |
| $CH_3$ | $n-C_4H_9$ | $OCH_3$ | $COOC_2H_5$ | $CF_3$ | $CH_2CH_2N(C_2H_5)_2$ |
| $CF_3$ | $n-C_4H_9$ | $CH_3$ | $COOC_2H_5$ | $OCH_3$ | $CH_2CH_2N(C_2H_5)_2$ |
| $SO_2NH_2$ | $n-C_4H_9$ | $CF_3$ | $COOC_2H_5$ | $CH_3$ | $CH_2CH_2N(C_2H_5)_2$ |
| $SO_2NH(CH_3)$ | $n-C_4H_9$ | H | $COO(n-C_4H_9)$ | $SO_2NH_2$ | $CH_2CH_2N(C_2H_5)_2$ |
| $SO_2N(CH_3)_2$ | $n-C_4H_9$ | Cl | $COO(n-C_4H_9)$ | $SO_2N(CH_3)_2$ | $CH_2CH_2N(C_2H_5)_2$ |
| H | $CF_3$ | F | $COO(n-C_4H_9)$ | H | $COC(CH_3)_3$ |
| Cl | $CF_3$ | $CF_3$ | $COO(n-C_4H_9)$ | Cl | $COC(CH_3)_3$ |
| F | $CF_3$ | $CH_3$ | $COO(n-C_4H_9)$ | F | $COC(CH_3)_3$ |
| H | $COOC_2H_5$ | H | $CH(OH)(C_2H_5)$ | | |
| Cl | $COOC_2H_5$ | Cl | $CH(OH)(C_2H_5)$ | | |
| $OCH_3$ | $COOC_2H_5$ | F | $CH(OH)(C_2H_5)$ | | |
| $SO_2N(CH_3)_2$ | $COOC_2H_5$ | $OCH_3$ | $CH(OH)(C_2H_5)$ | | |
| H | $CH(OH)CH_3$ | $SO_2NHCH_3$ | $CH(OH)(C_2H_5)$ | | |
| $CH_3$ | $CH(OH)CH_3$ | $CF_3$ | $CH_2CH_2N(C_4H_9)_2$ | | |
| $OCH_3$ | $CH(OH)CH_3$ | H | $C_2H_5$ | H | $O—(n-C_4H_9)$ |
| Cl | $CH(OH)CH_3$ | Cl | $C_2H_5$ | Cl | $O—(n-C_4H_9)$ |
| F | $CH(OH)CH_3$ | F | $C_2H_5$ | $OCH_3$ | $O—(n-C_4H_9)$ |
| $CF_3$ | $CH(OH)CH_3$ | $OCH_3$ | $C_2H_5$ | $CF_3$ | $O—(n-C_4H_9)$ |
| $SO_2NH_2$ | $CH(OH)CH_3$ | $CF_3$ | $C_2H_5$ | $CH_3$ | $O—(n-C_4H_9)$ |
| F | H | $SO_2N(CH_3)_2$ | $C_2H_5$ | $SO_2NH(CH_3)$ | $O—(n-C_4H_9)$ |
| $CF_3$ | H | H | $n-C_3H_7$ | H | $N(CH_3)_2$ |
| $CH_3$ | H | Cl | $n-C_3H_7$ | Cl | $N(CH_3)_2$ |
| $SO_2NH_2$ | H | $CH_3$ | $n-C_3H_7$ | F | $N(CH_3)_2$ |
| $SO_2NH(CH_3)$ | H | $SO_2NH(CH_3)$ | $n-C_3H_7$ | $OCH_3$ | $N(CH_3)_2$ |
| $SO_2N(CH_3)_2$ | H | H | $OCH_3$ | $CF_3$ | $N(CH_3)_2$ |
| H | $CH_2—CF_3$ | Cl | $OCH_3$ | $CH_3$ | $N(CH_3)_2$ |
| Cl | $CH_2—CF_3$ | F | $OCH_3$ | $SO_2NH_2$ | $N(CH_3)_2$ |
| F | $CH_2—CF_3$ | $OCH_3$ | $OCH_3$ | $SO_2N(CH_3)_2$ | $N(CH_3)_2$ |
| $CH_3$ | $CH_2—CF_3$ | $CH_3$ | $OCH_3$ | H | $N(C_2H_5)_2$ |
| $OCH_3$ | $CH_2—CF_3$ | $CF_3$ | $OCH_3$ | Cl | $N(C_2H_5)_2$ |

TABLE—Continued

| X | R | X | R | X | R |
|---|---|---|---|---|---|
| CF₃ | CH₂—CF₃ | SO₂NH₂ | OCH₃ | F | N(C₂H₅)₂ |
| SO₂NH₂ | CH₂—CF₃ | H | OC₂H₅ | OCH₃ | N(C₂H₅)₂ |
| SO₂N(CH₃)₂ | CH₂—CF₃ | Cl | OC₂H₅ | H | N(CH₃)(C₂H₅) |
| H | C₅H₁₁ | SO₂N(CH₃)₂ | OC₂H₅ | Cl | N(CH₃)(C₂H₅) |
| Cl | C₅H₁₁ | H | O—(n-C₃H₇) | CF₃ | N(CH₃)(C₂H₅) |
| F | C₅H₁₁ | Cl | O—(n-C₃H₇) | H | N(n-C₃H₇)₂ |
| CH₃ | C₅H₁₁ | CF₃ | O—(n-C₃H₇) | Cl | N(n-C₃H₇)₂ |
| OCH₃ | C₅H₁₁ | CH₃ | O—(n-C₃H₇) | CH₃ | N(n-C₃H₇)₂ |
| CF₃ | C₅H₁₁ | SO₂N(CH₃)₂ | O—(n-C₃H₇) | SO₂NH(CH₃) | N(n-C₃H₇)₂ |
| SO₂NHCH₃ | C₅H₁₁ | H | O—(i-C₃H₇) | H | N—(i-C₃H₇)₂ |
| H | CH₂CH₂N(CH₃)₂ | Cl | O—(i-C₃H₇) | Cl | N—(i-C₃H₇)₂ |
| Cl | CH₂CH₂N(CH₃)₂ | | | H | N—(n-C₄H₉)₂ |
| OCH₃ | CH₂CH₂N(CH₃)₂ | | | Cl | N—(n-C₄H₉)₂ |
| SO₂NH(CH₃) | CH₂CH₂N(CH₃)₂ | | | F | N—(n-C₄H₉)₂ |
| H | CH₂CH₂N(n-C₃H₇)₂ | | | OCH₃ | N—(n-C₄H₉)₂ |
| Cl | CH₂CH₂N(n-C₃H₇)₂ | | | SO₂NH₂ | N—(n-C₄H₉)₂ |
| F | CH₂CH₂N(n-C₃H₇)₂ | | | H | S—CH₃ |
| OCH₃ | CH₂CH₂N(n-C₃H₇)₂ | | | Cl | S—CH₃ |
| SO₂N(CH₃)₂ | CH₂CH₂N(n-C₃H₇)₂ | | | F | S—CH₃ |
| H | CH₂CH₂N(n-C₄H₉)₂ | | | OCH₃ | S—CH₃ |
| Cl | CH₂CH₂N(n-C₄H₉)₂ | | | CF₃ | S—CH₃ |
| CH₃ | CH₂CH₂N(n-C₄H₉)₂ | | | CH₃ | S—SH₃ |
| OCH₃ | CH₂CH₂N(n-C₄H₉)₂ | | | SO₂NH₂ | S—CH₃ |
| SO₂N(CH₃)₂ | S—CH₃ | Cl | S—(n-C₄H₉) | CF₃ | CONH₂ |
| H | S—C₂H₅ | OCH₃ | S—(n-C₄H₉) | SO₂NH₂ | CONH₂ |
| Cl | S—C₂H₅ | CF₃ | S—(n-C₄H₉) | SO₂NH(CH₃) | CONH₂ |
| F | S—C₂H₅ | SO₂NH₂ | S—(n-C₄H₉) | SO₂N(CH₃)₂ | CONH₂ |
| OCH₃ | S—C₂H₅ | H | S-(sec-C₄H₉) | H | COOCH₃ |
| SO₂NH₂ | S—C₂H₅ | OCH₃ | S-(sec-C₄H₉) | F | COOCH₃ |
| H | S-(n-C₃H₇) | F | S—(sec-C₄H₉) | H | COO(i-C₃H₇) |
| Cl | S—(n-C₃H₇) | Cl | S—(sec-C₄H₉) | Cl | COO(i—C₃H₇) |
| CH₃ | S—(n-C₃H₇) | SO₂N(CH₃)₂ | S—(sec-C₄H₉) | OCH₃ | COO(i-C₃H₇) |
| SO₂NH(CH₃) | S—(n-C₃H₇) | H | CONH₂ | SO₂NH₂ | COO(i-C₃H₇) |
| H | S—(i-C₃H₇) | Cl | CONH₂ | H | COO(n-C₃H₇) |
| Cl | S—(i-C₃H₇) | F | CONH₂ | Cl | COO(n-C₃H₇) |
| F | S—(i-C₃H₇) | OCH₃ | CONH₂ | OCH₃ | COO(n-C₄H₉) |
| H | S—(n-C₄H₉) | CH₃ | CONH₂ | CF₃ | COO(n-C₄H₉) |
| | | | | SO₂N(CH₃)₂ | COO(n-C₄H₉) |

EXAMPLE V 2-trifluoromethyl-3-bromomethylquinoxaline-di-N-oxide

2 - trifluoromethyl - 3 - methylquinoxaline-di-N-oxide (2.0 g.), bromine (1.3 g.) and chloroform (50 ml.) are mixed together, refluxed on a steam-bath for one-half hour then allowed to stand at room temperature overnight.

The mixture is then chromatographed on a column of Florisil (100 g.) packed with 25 percent chloroform-benzene. Elution of the column is accomplished with 25 percent chloroform-benzene. Fractions (50 ml.) are collected and assayed by thin layer chromatography. Those fractions (14–26) showing only one major spot with the system 3 percent methanol-chloroform are combined, evaporated to dryness and the residue recrystallized from methanol, M.P. 153–154° C. (36.6 percent).

In like manner, beginning with the appropriate X-substituted - 2 - trifluoromethyl - 3 - (lower alkyl)quinoxaline-di-N-oxide, the following 2-trifluoromethyl-3-(α-bromo-lower alkyl)quinoxaline-di-N-oxides are prepared:

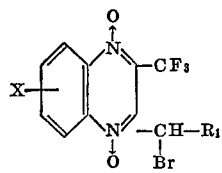

| X | R₁ | X | R₁ |
|---|---|---|---|
| Cl | H | CH₃ | n-C₃H₇ |
| F | H | SO₂NH₂ | n-C₃H₇ |
| OCH₃ | H | H | n-C₄H₉ |
| CH₃ | H | Cl | n-C₄H₉ |
| CF₃ | H | F | n-C₄H₉ |
| SO₂NH₂ | H | OCH₃ | n-C₄H₉ |
| SO₂NH(CH₃) | H | CF₃ | n-C₄H₉ |
| SO₂NH(CH₃)₂ | H | CH₃ | n-C₄H₉ |
| H | CH₃ | SO₂NH₂ | n-C₄H₉ |
| Cl | CH₃ | SO₂NH(CH₃) | n-C₄H₉ |
| F | CH₃ | | |
| OCH₃ | CH₃ | Cl | C₂H₅ |
| CF₃ | CH₃ | OCH₃ | C₂H₅ |
| CH₃ | CH₃ | SO₂N(CH₃)₂ | C₂H₅ |
| SO₂NH₂ | CH₃ | H | n-C₃H₇ |
| SO₂N(CH₃)₂ | CH₃ | Cl | n-C₃H₇ |
| H | C₂H₅ | | |

Repetition of this procedure but using chlorine in place of bromine produces the corresponding chloro compounds.

EXAMPLE VI 2-trifluoromethyl-3-hydroxymethylquinoxaline-di-N-oxide

A mixture of 2-trifluoromethyl-3-bromomethylquinoxaline - di - N - oxide (0.85 g.), silver nitrate (1.7 g.), methanol (25 ml.) and water (25 ml.) is refluxed on a steam-bath for six hours. Silver nitrate (1.7 g.) is added and the mixture refluxed overnight. The reaction mixture is filtered and the methanol removed from the filtrate by evaporation. Extraction of the aqueous solution with chloroform, drying the extract with anhydrous sodium sulfate, and evaporation of the extract to dryness gave an oil.

A benzene solution of the oil is chromatographed on a Florisil column (30 g.) packed with benzene and the column eluted with 300 ml. benzene followed by 3 percent chloroform-benzene. Fractions (50 ml.) are collected and analyzed by thin layer chromatography in the systems:

fractions 1–6: benzene
fractions 7–16: 3 percent chloroform-benzene
fractions 17–21: chloroform
fractions 22–29: 3 percent methanol-chloroform Fractions 22–29 yielded, upon evaporation to dryness, and crystallization from ether, the title product: M.P. 130–131° C.

Fractions 12–21 when worked up in the same manner gave 2 - trifluoromethyl - 3-methoxymethylquinoxaline-di-N-oxide: M.P. 121–123° C.

Similarly, fractions 9–11 gave 2-trifluoromethyl-3-nitro-oxymethylquinoxaline-di-N-oxide: M.P. 125–127° C.

EXAMPLE VII

Following the procedure of Example VI, the (6 and 7)-substituted - 2 - trifluoromethyl - 3 - (α-bromo-lower alkyl)quinoxaline-di-N-oxides of Example V are converted to the corresponding 6(and 7)-substituted-2-trifluoromethyl - 3 - (α - substituted-lower alkyl)quinoxaline-di- N-oxides wherein the α-substituents are hydroxy, methoxy and nitro-oxy.

EXAMPLE VIII

The following 2 - trifluoromethyl - quinoxaline-di-N-oxides are prepared from the appropriate benzofuroxan and trifluoromethyl compound of the formula $$CF_3—CH_2—CO—R$$

EXAMPLE IX

Following the procedure of Example I but using the appropriate β-diketone of the formula $$R_2—CO—CH_2—CO—CF_3$$

in place of 1,1,1-trifluoromethyl-2-butanone produces a mixture of the following compounds:

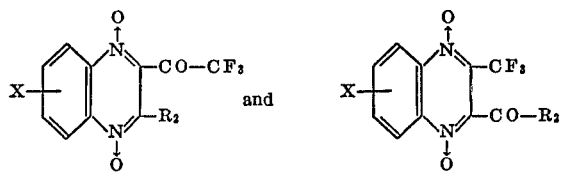

| X | R₂ | X | R₂ | X | R₂ |
|---|---|---|---|---|---|
| H | C₆H₅ | H | 5-methyl-2-thienyl | CF₃ | 2-pyrryl |
| Cl | C₆H₅ | Cl | ......do...... | OCH₃ | Do. |
| F | C₆H₅ | F | ......do...... | CH₃ | Do. |
| CH₃ | C₆H₅ | OCH₃ | ......do...... | SO₂N(CH₃)₂ | Do. |
| OCH₃ | C₆H₅ | SO₂NH₂ | ......do...... | H | 2-furyl |
| CF₃ | C₆H₅ | SO₂NHCH₃ | ......do...... | Cl | Do. |
| SO₂NH₂ | C₆H₅ | H | ......do...... | F | Do. |
| SO₂N(CH₃)₂ | C₆H₅ | Cl | ......do...... | CH₃ | Do. |
| H | CH₃ | F | ......do...... | OCH₃ | Do. |
| Cl | CH₃ | CH₃ | ......do...... | CF₃ | Do. |
| F | CH₃ | SO₂NH₂ | ......do...... | SO₂NH₂ | Do. |
| CH₃ | CH₃ | H | 5-bromo-2-thienyl | SO₂NHCH₃ | Do. |
| OCH₃ | CH₃ | Cl | ......do...... | | |
| SO₂NH₂ | CH₃ | F | ......do...... | | |
| SO₂NHCH₃ | CH₃ | OCH₃ | ......do...... | | |
| CF₃ | CH₃ | SO₂N(CH₃)₂ | ......do...... | | |
| H | CH₂CH(CH₃)CH₃ | H | 5-iodo-2-thienyl | | |
| Cl | CH₂CH(CH₃)CH₃ | Cl | ......do...... | | |
| F | CH₂CH(CH₃)CH₃ | F | ......do...... | | |
| OCH₃ | CH₂CH(CH₃)CH₃ | CF₃ | ......do...... | | |
| SO₂N(CH₃)₂ | CH₂CH(CH₃)CH₃ | OCH₃ | ......do...... | | |
| H | 2-thienyl | H | 2,5-dimethyl-3-thienyl | | |
| F | ......do...... | Cl | ......do...... | | |
| CH₃ | ......do...... | F | ......do...... | | |
| OCH₃ | ......do...... | OCH₃ | ......do...... | | |
| CF₃ | ......do...... | SO₂NH₂ | ......do...... | | |
| SO₂NH₂ | ......do...... | H | 2-pyrryl | | |
| SO₂N(CH₃)₂ | ......do...... | Cl | ......do...... | | |
| | | F | ......do...... | | | by the procedure of Example III:

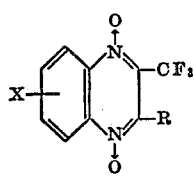

| X | R | X | R | X | R |
|---|---|---|---|---|---|
| H | C₆H₅ | SO₂NHCH₃ | C₆H₅ | Cl | CF₃ |
| Cl | C₆H₅ | SO₂N(CH₃)₂ | C₆H₅ | OCH₃ | CF₃ |
| F | C₆H₅ | H | H | CF₃ | CF₃ |
| CH₃ | C₆H₅ | Cl | H | SO₂NHCH₃ | CF₃ |
| OCH₃ | C₆H₅ | F | H | H | CH₃ |
| CF₃ | C₆H₅ | CH₃ | H | Cl | CH₃ |
| SO₂NH₂ | C₆H₅ | H | CF₃ | F | CH₃ |
| | | SO₂NH₂ | | | CH₃ |

EXAMPLE X 2-trifluoromethyl-3-acetoxymethylquinoxaline-di-N-oxide

A solution of silver acetate (2.0 g.) in water (100 ml.) and a solution of 2-trifluoromethyl-3-bromomethyl-quinoxaline-di-N-oxide (3.23 g.) in glacial acetic acid (100 ml.) are mixed together and heated on a steambath for one hour. The mixture is then filtered to remove silver bromide, the filtrate diluted with 3 volumes of water and extracted with chloroform (3× 50 ml.). The chloroform extract is washed with dilute nitric acid (1× 25 ml. of 10 percent) then with water (1× 30 ml.) and dried over anhydrous sodium sulfate. The chloroform is removed by evaporation and the residue dissolved in methanol (50 ml.). The product which crystallizes from the solution upon standing is filtered off and dried.

EXAMPLE XI 2-trifluoromethyl-3-(lower alkanoyloxy-lower alkyl)quinoxaline-di-N-oxides The following products are prepared by the procedure of Example X but using the appropriate 2-trifluoromethyl - 3 - (α-bromo-lower alkyl) quinoxaline-di-N-oxides of Example V and the appropriate silver alkanoates as reactants:

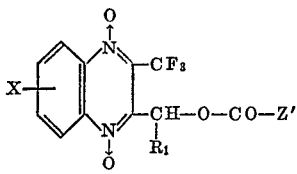

| X | R₁ | Z' | X | R₁ | Z' |
|---|---|---|---|---|---|
| Cl | H | CH₃ | SO₂NH₂ | n-C₃H₇ | CH₃ |
| F | H | CH₃ | OCH₃ | n-C₃H₇ | CH₃ |
| OCH₃ | H | CH₃ | H | CH₃ | CH₃ |
| CH₃ | H | CH₃ | Cl | CH₃ | CH₃ |
| SO₂NH(CH₃) | H | CH₃ | F | CH₃ | CH₃ |
| SO₂N(CH₃)₂ | H | CH₃ | OCH₃ | CH₃ | CH₃ |
| CF₃ | H | CH₃ | SO₂N(CH₃)₂ | CH₃ | CH₃ |
| H | H | C₂H₅ | H | C₂H₅ | CH₃ |
| Cl | H | C₂H₅ | Cl | C₂H₅ | CH₃ |
| F | H | C₂H₅ | OCH₃ | C₂H₅ | CH₃ |
| OCH₃ | H | C₂H₅ | SO₂N(CH₃)₂ | C₂H₅ | CH₃ |
| SO₂N(CH₃)₂ | H | C₂H₅ | H | n-C₃H₇ | CH₃ |
| H | H | n-C₃H₇ | Cl | n-C₃H₇ | CH₃ |
| Cl | H | n-C₃H₇ | CH₃ | n-C₃H₇ | CH₃ |
| CH₃ | H | n-C₃H₇ | H | n-C₄H₉ | CH₃ |
| CF₃ | H | n-C₃H₇ | Cl | n-C₄H₉ | CH₃ |
| F | n-C₄H₉ | CH₃ | OCH₃ | CH₃ | n-C₄H₉ |
| SO₂NH₂ | n-C₄H₉ | CH₃ | SO₂NH(CH₃) | CH₃ | n-C₄H₉ |
| H | CH₃ | C₂H₅ | H | C₂H₅ | n-C₄H₉ |
| Cl | CH₃ | C₂H₅ | Cl | C₂H₅ | n-C₄H₉ |
| OCH₃ | CH₃ | C₂H₅ | OCH₃ | C₂H₅ | n-C₄H₉ |
| CF₃ | CH₃ | C₂H₅ | H | n-C₃H₇ | n-C₄H₉ |
| SO₂NH₂ | CH₃ | C₂H₅ | CH₃ | n-C₃H₇ | n-C₄H₉ |
| H | C₂H₅ | C₂H₅ | H | n-C₄H₉ | n-C₄H₉ |
| Cl | C₂H₅ | C₂H₅ | F | n-C₄H₉ | n-C₄H₉ |
| OCH₃ | C₂H₅ | C₂H₅ | CF₃ | n-C₄H₉ | n-C₄H₉ |
| H | n-C₃H₇ | C₂H₅ | SO₂NH₂ | n-C₄H₉ | n-C₄H₉ |
| F | n-C₃H₇ | C₂H₅ | | | |
| OCH₃ | n-C₃H₇ | C₂H₅ | | | |
| H | n-C₄H₉ | C₂H₅ | H | n-C₃H₇ | n-C₃H₇ |
| Cl | n-C₄H₉ | C₂H₅ | Cl | n-C₃H₇ | n-C₃H₇ |
| OCH₃ | n-C₄H₉ | C₂H₅ | H | n-C₄H₉ | n-C₃H₇ |
| SO₂N(CH₃)₂ | n-C₄H₉ | C₂H₅ | Cl | n-C₄H₉ | n-C₃H₇ |
| H | CH₃ | n-C₃H₇ | OCH₃ | n-C₄H₉ | n-C₃H₇ |
| Cl | CH₃ | n-C₃H₇ | H | CH₃ | n-C₄H₉ |
| OCH₃ | CH₃ | n-C₃H₇ | Cl | CH₃ | n-C₄H₉ |
| H | C₂H₅ | n-C₃H₇ | F | CH₃ | n-C₄H₉ |
| F | C₂H₅ | n-C₃H₇ | | | |

EXAMPLE XII 2-trifluoroacetyl-3-(2-thienyl)-6(and 7)-chloroquinoxaline-di-N-oxide 5(or 6)-chlorobenzofuroxan (7.7 g.) and 4,4,4-trifluoro-1-(2-thienyl)-1,3-butanedione (11.1 g.) are added to ethanol (50 ml.) and the resulting solution cooled to 0° C. A solution of sodium (0.012 mole) in alcohol (25 ml.) is then added dropwise while maintaining the temperature at 0° to 5° C. Upon completion of addition, the reaction mixture is allowed to warm to room temperature then heated to 60° C. for six hours. The yellow precipitate is filtered off and the filtrate concentrated to a gummy oil. The oil is triturated with isopropanol and stored overnight. Scratching the container with a glass rod precipitates a gummy solid. The isopropanol solution is decanted and cooled to precipitate the product; yield 2.5 g.

Additional product (0.7 g.) is recovered by trituration of the gummy solid with methanol and removal of the methanol solvent.

EXAMPLE XIII 2-trifluoromethyl-3-dimethylaminomethylquinoxaline-di-N-oxide hydrobromide A mixture of 2-trifluoromethyl-3-bromomethylquinoxaline-di-N-oxide (20 g.) in N,N-dimethylformamide (200 ml.) is stirred at room temperature and dimethylamine bubbled in until the mixture is saturated. The reaction is exothermic and a change in the appearance of the solid reactant noted. The mixture is stirred for one-half hour then filtered to give the product.

EXAMPLE XIV

Repetition of the procedure of Example XIII but using ammonia or the appropriate amine and appropriate 2-trifluoromethyl - 3-(α-bromo-lower alkyl)quinoxaline-di-N-oxide of Example V provides the following compounds:

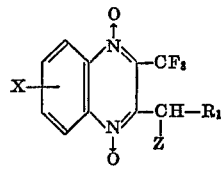

| X | R₁ | Z | X | R₁ | Z |
|---|---|---|---|---|---|
| Cl | H | N(CH₃)₂ | SO₂N(CH₃)₂ | H | N(n-C₄H₉)₂ |
| F | H | N(CH₃)₂ | H | CH₃ | N(CH₃)₂ |
| OCH₃ | H | N(CH₃)₂ | Cl | CH₃ | N(CH₃)₂ |
| CH₃ | H | N(CH₃)₂ | F | CH₃ | N(CH₃)₂ |
| CF₃ | H | N(CH₃)₂ | OCH₃ | CH₃ | N(CH₃)₂ |
| SO₂NH₂ | H | N(CH₃)₂ | CF₃ | CH₃ | N(CH₃)₂ |
| SO₂NH(CH₃) | H | N(CH₃)₂ | SO₂N(CH₃)₂ | CH₃ | N(CH₃)₂ |
| SO₂N(CH₃)₂ | H | N(CH₃)₂ | H | CH₃ | N(C₂H₅)₂ |
| H | H | N(C₂H₅)₂ | Cl | CH₃ | N(C₂H₅)₂ |
| Cl | H | N(C₂H₅)₂ | H | CH₃ | N(C₃H₇)₂ |
| OCH₃ | H | N(C₂H₅)₂ | CH₃ | CH₃ | N(C₃H₇)₂ |
| SO₂NH₂ | H | N(C₂H₅)₂ | SO₂NH₂ | CH₃ | N(C₃H₇)₂ |
| H | H | N(C₃H₇)₂ | H | CH₃ | N(n-C₄H₉)₂ |
| Cl | H | N(C₃H₇)₂ | Cl | CH₃ | N(n-C₄H₉)₂ |
| F | H | N(C₃H₇)₂ | OCH₃ | CH₃ | N(n-C₄H₉)₂ |
| CH₃ | H | N(C₃H₇)₂ | SO₂NH(CH₃) | CH₃ | N(n-C₄H₉)₂ |
| H | H | N(n-C₄H₉)₂ | H | C₂H₅ | N(CH₃)₂ |
| Cl | H | N(n-C₄H₉)₂ | Cl | C₂H₅ | N(CH₃)₂ |
| OCH₃ | H | N(n-C₄H₉)₂ | OCH₃ | C₂H₅ | N(CH₃)₂ |
| H | C₂H₅ | N(C₂H₅)₂ | SO₂NH₂ | H | NH(n-C₄H₉) |

TABLE—Continued

| X | R₁ | Z | X | R₁ | Z |
|---|---|---|---|---|---|
| OCH₃ | C₂H₅ | N(C₂H₅)₂ | H | CH₃ | NH(CH₃) |
| SO₂N(CH₃)₂ | C₂H₅ | N(C₂H₅)₂ | Cl | CH₃ | NH(CH₃) |
| H | n-C₃H₇ | N(C₃H₇)₂ | OCH₃ | CH₃ | NH(CH₃) |
| Cl | n-C₃H₇ | N(CH₇)₂ | F | CH₃ | NH(CH₃) |
| CH₃ | n-C₃H₇ | N(C₃H₇)₂ | SO₂N(CH₃)₂ | CH₃ | NH(CH₃) |
| H | n-C₃H₇ | N(n-C₄H₉)₂ | H | CH₃ | NH(C₂H₅) |
| Cl | n-C₃H₇ | H | H | CH₃ | NH(n-C₃H₇) |
| F | n-C₃H₇ | N(n-C₄H₉)₂ | H | CH₃ | NH(i-C₄H₉) |
| OCH₃ | n-C₃H₇ | N(n-C₄H₉)₂ | H | C₂H₅ | NH(CH₃) |
| CF₃ | n-C₃H₇ | N(n-C₄H₉)₂ | Cl | C₂H₅ | NH(CH₃) |
| SO₂N(CH₃)₂ | C₂H₅ | N(n-C₄H₉)₂ | OCH₃ | C₂H₅ | NH(CH₃) |
| H | n-C₄H₉ | N(n-C₄H₉)₂ | H | C₂H₅ | NH(n-C₄H₉) |
| Cl | n-C₄H₉ | N(n-C₄H₉)₂ | CF₃ | C₂H₅ | NH(n-C₄H₉) |
| CF₃ | n-C₄H₉ | N(n-C₄H₉)₂ | H | n-C₃H₇ | NH(CH₃) |
| CH₃ | n-C₄H₉ | N(n-C₄H₉)₂ | Cl | n-C₃H₇ | NH(C₂H₅) |
| H | H | NH(CH₃) | OCH₃ | n-C₃H₇ | NH(C₂H₅) |
| Cl | H | NH(CH₃) | H | n-C₄H₉ | NH(CH₃) |
| F | H | NH(CH₃) | Cl | n-C₄H₉ | NH(n-C₄H₉) |
| OCH₃ | H | NH(CH₃) | H | H | NH₂ |
| CH₃ | H | NH(CH₃) | Cl | H | NH₂ |
| SO₂N(CH₃)₂ | H | NH(CH₃) | F | H | NH₂ |
| H | H | NH(C₂H₅) | OCH₃ | H | NH₂ |
| Cl | H | NH(C₂H₅) | CF₃ | H | NH₂ |
| CF₃ | H | NH(C₂H₅) | SO₂NH(CH₃) | H | NH₂ |
| H | H | NH(n-C₃H₇) | H | CH₃ | NH₂ |
| H | H | NH(i-C₃H₇) | SO₂NH₂ | CH₃ | NH₂ |
| H | H | NH(n-C₄H₉) | OCH₃ | CH₃ | NH₂ |
| Cl | H | NH(n-C₄H₉) | CF₃ | CH₃ | NH₂ |
| OCH₃ | H | NH(n-C₄H₉) | F | CH₃ | NH₂ |

EXAMPLE XV

Di-N-oxide of {[3-(2-trifluoromethyl)quinoxalinyl]-methyl}trimethylammonium bromide Repetition of the procedure of Example XIII but using trimethylamine in place of dimethylamine produces the title compound.

In like manner, the 2 - trifluoromethyl-3-(α-bromo-lower alkyl)-quinoxaline-di-N-oxides of Example V are converted to the corresponding α-trimethylammonium bromide derivatives.

EXAMPLE XVI 2-trifluoromethyl-3-methylthiomethylquinoxaline-di-N-oxide

Methylmercaptan (3.0 g.) is bubbled into a flask containing sodium hydroxide (67 ml. of 1 N) and water (33 ml.) and which was purged with nitrogen. Chloroform (100 ml.) is added and the mixture stirred at room temperature. Then, {[3 - (2 - trifluoromethyl)quinoxalinyl] methyl}trimethylammonium bromide-di-N-oxide (10 g.) is added portionwise. Each portion is allowed to dissolve before adding the next portion. The mixture is stirred for two hours following completion of addition. The chloroform phase is separated and the aqueous phase extracted with chloroform (2× 25 ml.). The combined chloroform extracts are dried over anhydrous sodium sulfate, then evaporated to dryness under reduced pressure. The residue is crystallized from acetone-chloroform (1—1) to give the product.

Following this procedure, the {[3-(2-trifluoromethyl) quinoxalinyl]-(α-lower alkyl)}trimethylammonium bromide-di-N-oxides of Example XV are converted, by reaction with the appropriate lower alkyl mercaptan to compounds having the formula:

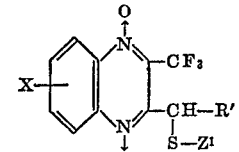

| X | R' | Z' | X | R' | Z' |
|---|---|---|---|---|---|
| Cl | H | CH₃ | CF₃ | H | n-C₄H₉ |
| F | H | CH₃ | SO₂N(CH₃)₂ | H | n-C₄H₉ |
| OCH₃ | H | CH₃ | SO₂NH(CH₃) | H | n-C₄H₉ |
| CF₃ | H | CH₃ | H | CH₃ | CH₃ |
| CH₃ | H | CH₃ | Cl | CH₃ | CH₃ |
| SO₂NH₂ | H | CH₃ | F | CH₃ | CH₃ |
| SO₂N(CH₃)₂ | H | CH₃ | OCH₃ | CH₃ | CH₃ |
| H | H | C₂H₅ | CF₃ | CH₃ | CH₃ |
| Cl | H | C₂H₅ | SO₂NH₂ | CH₃ | CH₃ |
| OCH₃ | H | C₂H₅ | H | C₂H₅ | CH₃ |
| SO₂N(CH₃)₂ | H | C₂H₅ | H | C₂H₅ | n-C₄H₉ |
| H | H | n-C₃H₇ | H | C₂H₅ | i-C₃H₇ |
| Cl | H | n-C₃H₇ | H | H | i-C₃H₇ |
| CH₃ | H | n-C₃H₇ | Cl | C₂H₅ | CH₃ |
| SO₂NH₂ | H | n-C₃H₇ | OCH₃ | C₂H₅ | CH₃ |
| H | H | n-C₄H₉ | CF₃ | C₂H₅ | CH₃ |
| Cl | H | n-C₄H₉ | H | n-C₃H₇ | CH₃ |
| F | H | n-C₄H₉ | Cl | n-C₃H₇ | CH₃ |
| OCH₃ | H | n-C₄H₉ | SO₂NH₂ | n-C₃H₇ | CH₃ |
| H | n-C₄H₉ | CH₃ | H | n-C₃H₇ | C₂H₅ |
| OCH₃ | n-C₄H₉ | CH₃ | Cl | n-C₃H₇ | C₂H₅ |
| SO₂NH₂ | n-C₄H₉ | CH₃ | OCH₃ | n-C₃H₇ | C₂H₅ |
| Cl | n-C₄H₉ | CH₃ | H | n-C₃H₇ | n-C₄H₉ |
| H | C₂H₅ | C₂H₅ | H | n-C₄H₉ | CH₃ |
| Cl | C₂H₅ | C₂H₅ | Cl | n-C₄H₉ | CH₃ |
| OCH₃ | C₂H₅ | C₂H₅ | OCH₃ | n-C₄H₉ | CH₃ |
| F | C₂H₅ | n-C₃H₇ | H | n-C₄H₉ | CH₃ |
| CH₃ | C₂H₅ | n-C₃H₇ | Cl | n-C₄H₉ | C₂H₅ |
| Cl | C₂H₅ | n-C₄H₉ | H | n-C₄H₉ | i-C₃H₇ |
| CF₃ | C₂H₅ | n-C₄H₉ | H | n-C₄H₉ | n-C₄H₉ |
| OCH₃ | C₂H₅ | n-C₄H₉ | Cl | n-C₄H₉ | n-C₄H₉ |
| CH₃ | n-C₃H₇ | CH₃ | OCH₃ | n-C₄H₉ | n-C₄H₉ |

EXAMPLE XVII 2-trifluoromethyl-3-methylsulfinylmethylquinoxaline-di-N-oxide 2-trifluoromethyl - 3 - methylthiomethylquinoxaline-di-N-oxide (0.7 g.) is dissolved in chloroform (35 ml.) and cooled to 0° C. with stirring. A solution of m-chloroperbenzoic acid (0.57 g. of 85 percent acid) in chloroform (10 ml.) is added dropwise and the reaction mixture stored at 0° C. for four hours. The mixture is extracted with aqueous sodium bicarbonate (1× 10 ml. of 10 percent) then with water (1× 10 ml.) and dried over anhydrous sodium sulfate. Evaporation of the chloroform gives the product which is crystallized from ethanol-chloroform (1—1).

Following this procedure, the 2-trifluoromethyl-3-[α-(lower alkyl)-thio(lower alkyl)]quinoxaline-di-N-oxides of Example XVI and the 2-trifluoromethyl-3-(lower alkyl thio)quinoxaline-di-N-oxides of Example IV are oxidized to their corresponding sulfinyl derivatives.

EXAMPLE XVIII 2-trifluoromethyl-3-methylsulfonylmethylquinoxaline-di-N-oxide 2-trifluoromethyl - 3 - methylthiomethylquinoxaline-di-N-oxide (0.3 g.) is dissolved in chloroform (15 ml.) and a solution of m-chloroperbenzoic acid (0.4 g. of 85 percent) in chloroform added dropwise at room temperature and the reaction mixture held at room temperature overnight. The precipitated m-chlorobenzoic acid is filtered off, the filtrate refluxed on a steam-bath for 15 minutes, then washed successively with sodium bicarbonate (1× 5 ml. of 10 percent) and water (1× 5 ml.) and dried over anhydrous sodium sulfate. Removal of the chloroform gives the product.

In like manner, the 2-trifluoromethyl-3-[α-(lower alkyl) thio lower alkyl)]quinoxaline-di-N-oxides of Example XVI and the 2-trifluoromethyl-3-(lower alkyl thio)quinoxaline-di-N-oxides of Example IV are converted to their corresponding sulfonyl derivatives.

EXAMPLE XIX 2-trifluoromethyl-3-(α-carboxy alkyl)quinoxaline-di-N-oxides and related compounds Utilizing the procedure of Example III, the following compounds are prepared from the appropriate benzofuroxans and ketones of the formula $CF_3$—CO—$CH_2$—R″ wherein R″=CH(Z)$R_1$:

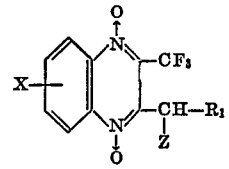

| X | Z | $R_1$ | X | Z | $R_1$ |
|---|---|---|---|---|---|
| H | COOH | H | F | $COOCH_3$ | H |
| Cl | COOH | H | $OCH_3$ | $COOCH_3$ | H |
| F | COOH | H | $SO_2NH_2$ | $COOCH_3$ | H |
| $OCH_3$ | COOH | H | H | $COO(n-C_4H_9)$ | H |
| $CH_3$ | COOH | H | Cl | $COO(n-C_4H_9)$ | H |
| $SO_2NH_2$ | COOH | H | $CH_3$ | $COO(n-C_4H_9)$ | H |
| H | COOH | $CH_3$ | $SO_2N(CH_3)_2$ | $COO(n-C_4H_9)$ | H |
| Cl | COOH | $CH_3$ | H | $COOCH_3$ | $CH_3$ |
| $CF_3$ | COOH | $CH_3$ | Cl | $COOC_2H_5$ | $C_2H_5$ |
| $SO_2N(CH_3)_2$ | COOH | $CH_3$ | $CH_3$ | $COOC_2H_5$ | $C_2H_5$ |
| H | COOH | $n-C_3H_7$ | H | $COOCH_3$ | $n-C_3H_7$ |
| F | COOH | $n-C_3H_7$ | H | $COO(n-C_4H_9)$ | $CH_3$ |
| $OCH_3$ | COOH | $n-C_3H_7$ | Cl | $COO(n-C_4H_9)$ | $CH_3$ |
| $SO_2NH(CH_3)$ | COOH | $n-C_3H_7$ | $OCH_3$ | $COO(n-C_4H_9)$ | $CH_3$ |
| H | $COOCH_3$ | H | $CF_3$ | $COO(n-C_4H_9)$ | $CH_3$ |
| Cl | $COOCH_3$ | H | $SO_2N(CH_3)_2$ | $COO(n-C_4H_9)$ | $CH_3$ |
| H | $CONH_2$ | H | $OCH_3$ | $CONH_2$ | $CH_3$ |
| Cl | $CONH_2$ | H | $SO_2NH_2$ | $CONH_2$ | $CH_3$ |
| F | $CONH_2$ | H | H | $CONH_2$ | $n-C_3H_7$ |
| $OCH_3$ | $CONH_2$ | H | Cl | $CONH_2$ | $n-C_3H_7$ |
| $CH_3$ | $CONH_2$ | H | $CF_3$ | $CONH_2$ | $n-C_3H_7$ |
| $CF_3$ | $CONH_2$ | H | $SO_2N(CH_3)_2$ | $CONH_2$ | $n-C_3H_7$ |
| $SO_2NH_2$ | $CONH_2$ | H | H | $CONH_2$ | $n-C_4H_9$ |
| $SO_2NH(CH_3)$ | $CONH_2$ | H | Cl | $CONH_2$ | $n-C_4H_9$ |
| $SO_2N(CH_3)_2$ | $CONH_2$ | H | H | $CONH_2$ | $C_2H_5$ |
| H | $CONH_2$ | $CH_3$ | $OCH_3$ | $CONH_2$ | $C_2H_5$ |
| Cl | $CONH_2$ | $CH_3$ | $SO_2NH_2$ | $CONH_2$ | $C_2H_5$ |

EXAMPLE XX 2-trifluoromethyl-3-fluoromethylquinoxaline-di-N-oxide

To a solution of the title product of Example V, 2-trifluoromethyl-3-bromomethylquinoxaline-di-N-oxide, (0.01 mole), in methylene chloride (50 ml.) is added mercuric fluoride (0.012 mole) and the mixture stirred at room temperature for two hours. The mixture is then filtered, the filter cake washed with methylene chloride and the combined filtrate and washings evaporated to dryness to give the product.

The remaining bromo compounds of Example V are converted to their corresponding fluoro compounds in like manner.

EXAMPLE XXI 2-trifluoromethyl-3-α-cyano(lower alkyl) quinoxaline-di-N-oxide

The products of Example V are converted to the corresponding cyano derivatives by reaction with potassium cyanide. The general procedure comprises reacting equimolar quantities of the appropriate bromo compound in methanol solution with potassium cyanide at room temperature overnight. The mixture is filtered then evaporated to dryness and the residue extracted with ether. The ether solution is decolorized and the ether then removed to give the product.

EXAMPLE XXII 2-trifluoromethyl-3-chloroquinoxaline-di-N-oxide

The appropriate 2-trifluoromethyl-3-lower alkyl thio quinoxaline-di-N-oxide of Example V (0.01 mole) is dissolved in concentrated hydrochloric acid (10 ml.) and the mixture warmed on a steam-bath for 10 minutes. It is then diluted with 5 volumes of water and the resulting precipitate taken up in chloroform. The chloroform solution is dried and evaporated to dryness to give the product.

The following compounds are thus prepared:

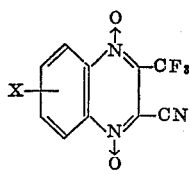

| X | X |
|---|---|
| H | CF₃ |
| Cl | CH₃ |
| F | SO₂NH₂ |
| OCH₃ | SO₂NH(CH₃) |
|  | SO₂N(CH₃)₂ |

Repetition of this procedure but substituting hydrobromic or hydrofluoric acid for hydrochloric acid produces the corresponding bromo and fluoro derivatives.

EXAMPLE XXIII 2-trifluromethyl-3-cyanoquinoxaline-di-N-oxides

The appropriate 2-trifluoromethyl-3-haloquinoxaline-di-N-oxide (Example XXII) is dissolved in chloroform (0.025 mole in 75 ml.) and a solution of potassium cyanide (0.025 mole) in methanol (50 ml.) and water (10 ml.) added. The reaction mixture is stirred at room temperature overnight then evaporated to dryness. The residue is taken up in chloroform, the chloroform solution dried over anhydrous sodium sulfate, decolorized, filtered and evaporated to dryness to give the impure product. The residue is taken up in benzene.

The compounds thus prepared are:

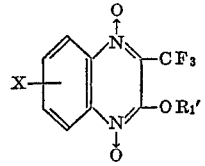

wherein X is H, Cl, F, OCH₃, CH₃, CF₃, SO₂NH₂, SO₂NH(CH₃) and SO₂N(CH₃)₂.

EXAMPLE XXIV 2-trifluoromethyl-3-aminoquinoxaline-di-N-oxides

The appropriate 2-trifluoromethyl-3-chloroquinoxaline-di-N-oxide (0.025 mole) is dissolved in chloroform (10 ml.) and an excess of ammonia (0.06 mole) in methanol added. The mixture is stirred overnight in a stoppered flask at ambient temperature then evaporated to dryness. The residue is dissolved in water (10 ml.) and the solution extracted with chloroform (4×5 ml.). The combined extracts are dried (Na₂SO₄), filtered and evaporated to dryness.

In like manner, the products of Example XXII are converted to the corresponding 2-trifluoromethyl-3-amino-6(and 7)-substituted quinoxaline-di-N-oxides wherein the substituents are Cl, F, CH₃, OCH₃, CF₃, SO₂NH₂, SO₂NH(CH₃) and SO₂N(CH₃)₂.

EXAMPLE XXV 2-trifluoromethyl-3-mono(lower alkyl) aminoquinoxaline-di-N-oxides The procedure of Example XXIV is repeated but using the appropriate mono(lower alkyl)amine and 2-trifluoromethyl-3-chloroquinoxaline-di-N-oxides as reactants to give the following compounds:

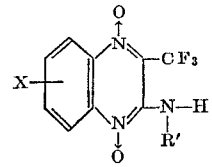

| X | R' | X | R' |
|---|---|---|---|
| H | CH₃ | SO₂NH(CH₃) | CH₃ |
| H | C₂H₅ | SO₂NH(CH₃) | C₂H₅ |
| H | i-C₃H₇ | SO₂N(CH₃)₂ | CH₃ |
| H | n-C₄H₉ | SO₂N(CH₃)₂ | n-C₄H₉ |
| Cl | CH₃ | | |
| Cl | n-C₃H₇ | | |
| F | CH₃ | | |
| F | C₂H₅ | | |
| OCH₃ | CH₃ | | |
| OCH₃ | C₂H₅ | | |
| OCH₃ | n-C₄H₉ | | |
| CF₃ | CH₃ | | |
| CF₃ | n-C₄H₉ | | |
| CH₃ | CH₃ | | |
| CH₃ | n-C₃H₇ | | |
| SO₂NH₂ | CH₃ | | |
| SO₂NH₂ | n-C₄H₉ | | |

EXAMPLE XXVI 2-trifluoromethyl-3-lower alkoxyquinoxaline-di-N-oxides

The 2 - trifluoromethyl-3-chloroquinoxaline-di-N-oxide (0.01 mole) compound is dissolved in chloroform (30 ml.) and a solution of sodium (0.01 mole) in the appropriate alcohol (R₁'OH, 25 ml.) added to it dropwise at room temperature with efficient stirring. The reaction mixture is allowed to stand overnight then evaporated to dryness. The residue is crystallized from methanol/ether.

The following compounds are thus prepared:

| X | R₁' | X | R₁' | X | R₁' |
|---|---|---|---|---|---|
| H | CH₃ | H | C₂H₅ | Cl | i-C₃H₇ |
| Cl | CH₃ | Cl | C₂H₅ | H | n-C₄H₉ |
| F | CH₃ | F | C₂H₅ | Cl | n-C₄H₉ |
| OCH₃ | CH₃ | OCH₃ | C₂H₅ | F | n-C₄H₉ |
| CH₃ | CH₃ | H | n-C₃H₇ | OCH₃ | n-C₄H₉ |
| CF₃ | CH₃ | Cl | n-C₃H₇ | CF₃ | n-C₄H₉ |
| SO₂NH₂ | CH₃ | OCH₃ | n-C₃H₇ | CH₃ | n-C₄H₉ |
| SO₂NH(CH₃) | CH₃ | SO₂NH₂ | n-C₃H₇ | SO₂NH(CH₃) | n-C₄H₉ |
| SO₂N(CH₃)₂ | CH₃ | H | i-C₃H₇ | SO₂N(CH₃)₂ | n-C₄H₉ |

EXAMPLE XXVII 2-trifluoromethyl-3-formylquinoxaline-di-N-oxide

A mixture of 2-trifluoromethyl-3-bromomethylquinoxaline-di-N-oxide (0.01 mole), dimethylsulfoxide (10 ml.) and N,N-dimethylformamide (10 ml.) is heated to maximum temperature on a steam-bath for one-half hour with occasional stirring. The mixture is then cooled, filtered and washed with acetone.

In line manner, the following 2-trifluoromethyl-3-formyl-(X - substituted)quinoxaline-di-N-oxides are prepared from the appropriate 2-trifluoromethyl-3-bromomethyl-(X-substituted)quinoxaline-di - N - oxides of Example V wherein X is chloro, fluoro, methoxy, methyl, trifluoromethyl, sulfonamido, N-methylsulfonamido and N,N-dimethylsulfonamido.

EXAMPLE XXVIII 2-trifluoromethyl-3-formylquinoxaline-di-N-oxide carbomethoxyhydrazone A solution of methylcarbazate (0.9 g.) in methanol (25 ml.) is added all at once to a well-stirred solution of 2-trifluoromethyl-3-formylquinoxaline-di-N-oxide (5.16 g.) in methanol (250 ml.) at room temperature. Two drops of concentrated hydrochloric acid are added, the mixture stirred for three hours then filtered to remove the product. The crystals are washed with methanol then air-dried.

EXAMPLE XXIX 2-trifluoromethyl-3-formylquinoxaline-di-N-oxide semicarbazone

A warm solution (40°–50° C.) of semicarbazide hydrochloride (5.55 g.) in methanol (300 ml.) is added to a solution of 2-trifluoromethyl-3-formylquinoxaline-di-N-oxide (5.16 g.) in methanol (300 ml.) and the mixture stirred for three hours. The product is recovered by filtration, washed with warm methanol and air-dried.

EXAMPLE XXX

The following compounds are prepared by the procedures of Examples XXVIII and XXIX from the appropriate 2 - trifluoromethyl-3-formylquinoxaline-di-N-oxides and amines $H_2N$—$R_5$:

EXAMPLE XXXII

The 2-trifluoromethyl-3-[α-carboxy(lower alkyl)]quinoxaline-di-N-oxides of Examples XIX are converted to their sodium and potassium salts by careful neutralization in methanol solution with dilute ethanol solution of sodium or potassium ethylate. The salts are recovered by filtration or evaporation of the solvent.

PREPARATION A

Trifluoromethyl(lower alkyl)thiomethyl ketones

The following general procedure (Bradsher et al., J. Am. Chem. Soc. 76, 115, 1954) is used for the preparation of the title ketones of the formula $$CF_3—CO—CH_2—S—R'$$

wherein R' is methyl, ethyl, n-propyl, n-butyl, isopropyl and sec-butyl.

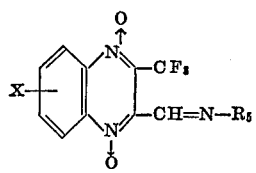

| X | R_5 | X | R_5 | X | R_5 |
|---|---|---|---|---|---|
| Cl | NH—COOCH_3 | H | NH—COO(CH_2)_3OH | F | NH—C(NH)—NH_2 |
| F | NH—COOCH_3 | Cl | NH—COO(CH_2)_3OH | OCH_3 | NH—C(NH)—NH_2 |
| OCH_3 | NH—COOCH_3 | CH_3 | NH—COO(CH_2)_3OH | CH_3 | NH—C(NH)—NH_2 |
| CH_3 | NH—COOCH_3 | SO_2N(CH_3)_2 | NH—COO(CH_2)_3OH | SO_2NH_2 | NH—C(NH)—NH_2 |
| CF_3 | NH—COOCH_3 | Cl | NH—CO—NH_2 | H | NH—CH_3 |
| SO_2NH_2 | NH—COOCH_3 | F | NH—CO—NH_2 | Cl | NH—CH_3 |
| H | NH—COOC_2H_5 | OCH_3 | NH—CO—NH_2 | F | NH—CH_3 |
| Cl | NH—COOC_2H_5 | CH_3 | NH—CO—NH_2 | OCH_3 | NH—CH_3 |
| SO_2N(CH_3)_2 | NH—COOC_2H_5 | CF_3 | NH—CO—NH_2 | SO_2NH_2 | NH—CH_3 |
| H | NH—COO(n-C_4H_9) | SO_2N(CH_3)_2 | NH—CO—NH_2 | H | NH—C_2H_5 |
| Cl | NH—COO(n-C_4H_9) | H | NH—CS—NH_2 | Cl | NH—C_2H_5 |
| OCH_3 | NH—COO(n-C_4H_9) | Cl | NH—CS—NH_2 | CF_3 | NH—C_2H_5 |
| SO_2NH(CH_3) | NH—COO(n-C_4H_9) | F | NH—CS—NH_2 | SO_2N(CH_3)_2 | NH—C_2H_5 |
| H | NH—COOCH_2CH_2OH | OCH_3 | NH—CS—NH_2 | H | NH—(i-C_3H_7) |
| F | NH—COOCH_2CH_2OH | SO_2NH_2 | NH—CS—NH_2 | H | NH—(i-C_4H_9) |
| OCH_3 | NH—COOCH_2CH_2OH | SO_2NH(CH_3) | NH—CS—NH_2 | Cl | NH—(n-C_4H_9) |
| Cl | NH—COOCH_2CH_2OH | H | NH—C(NH)—NH_2 | F | NH—(n-C_4H_9) |
| SO_2NH_2 | NH—COOCH_2CH_2OH | Cl | NH—C(NH)—NH_2 | OCH_3 | NH—(n-C_4H_9) |
| SO_2NH_2 | NH—(n-C_4H_9) | SO_2N(CH_3)_2 | NH—C_7H_7 | Cl | O—(n-C_4H_9) |
| CF_3 | NH—(n-C_4H_9) | H | NH—CH_2CH_2OH | F | O—(n-C_4H_9) |
| H | NH—CO—CH_3 | Cl | NH—CH_2CH_2OH | CH_3 | O—(n-C_4H_9) |
| Cl | NH—CO—CH_3 | F | NH—CH_2CH_2OH | SO_2NH(CH_3) | O—(n-C_4H_9) |
| OCH_3 | NH—CO—CH_3 | OCH_3 | NH—CH_2CH_2OH | | |
| CH_3 | NH—CO—CH_3 | CF_3 | NH—CH_2CH_2OH | | |
| SO_2NH_2 | NH—CO—CH_3 | SO_2NH_2 | NH—CH_2CH_2OH | | |
| H | NH—CO—C_2H_5 | H | NH—(CH_2)_4OH | | |
| Cl | NH—CO—C_2H_5 | Cl | NH—(CH_2)_4OH | | |
| H | NH—CO—(n-C_4H_9) | CH_3 | NH—(CH_2)_4OH | | |
| Cl | NH—CO—(n-C_4H_9) | SO_2N(CH_3)_2 | NH—(CH_2)_4OH | | |
| F | NH—CO—(n-C_4H_9) | H | OH | | |
| CF_3 | NH—CO—(n-C_4H_9) | Cl | OH | | |
| SO_2N(CH_3)_2 | NH—CO—(n-C_4H_9) | F | OH | | |
| H | NH—CO—C_6H_5 | OCH_3 | OH | | |
| Cl | NH—CO—C_6H_5 | CH_3 | OH | | |
| F | NH—CO—C_6H_5 | SO_2NH_2 | OH | | |
| OCH_3 | NH—CO—C_6H_5 | SO_2NH(CH_3) | OH | | |
| CH_3 | NH—CO—C_6H_5 | H | OCH_3 | | |
| SO_2NH(CH_3) | NH—CO—C_6H_5 | F | OCH_3 | | |
| SO_2NH_2 | NH—CO—C_6H_5 | OCH_3 | OCH_3 | | |
| H | NH—C_7H_7 | SO_2N(CH_3)_2 | OCH_3 | | |
| Cl | NH—C_7H_7 | H | OC_2H_5 | | |
| F | NH—C_7H_7 | SO_2NH_2 | OC_2H_5 | | |
| OCH_3 | NH—C_7H_7 | CH_3 | OC_2H_5 | | |
| CH_3 | NH—C_7H_7 | H | O—(i-C_3H_7) | | |
| CF_3 | NH—C_7H_7 | H | O—(n-C_4H_9) | | |

EXAMPLE XXXI

The compounds of Examples IV and XIV containing an amino, mono(lower alkyl)amino, di(lower alkyl)amino or di(lower alkyl)aminoethyl group are converted to their acid addition salts by treating a solution of the appropriate compound in methanol with a stoichiometric amount of the appropriate acid. The mixture is stirred for one-half hour and the acid salt recovered by evaporation of the solvent or by precipitation with a non-solvent, e.g., ether. In this manner, the hydrochloride, hydrobromide, sulfate, phosphate, citrate, oxalate, acetate, lactate, pamoate, butyrate, benzoate and succinate are prepared.

The (lower alkyl)mercaptan (0.33 mole) is added to a solution of sodium (7.7 g.) in ethanol (200 ml.) and the mixture stirred and chilled in an ice-bath. 3-chloro-1,1,1-trifluoro-2-propanone (0.36 mole) is added to the mixture over a twenty-minute period after which the mixture is refluxed for two hours and stirred rigorously. The mixture is then filtered and the filtrate fractionated to provide the desired ketone.

PREPARATION B

Trifluoromethyl(lower alkoxy)methyl ketones

Sodium (7.7 g.) is added to the appropriate lower alkanol (205 ml.) and the mixture stirred until solution is complete. The mixture is then cooled in an ice-bath and 3-chloro-1,1,1-trifluoro-2-propanone (0.36 mole) added dropwise with stirring over a period of one-half hour. Upon completion of addition, the mixture is refluxed for two hours, then filtered and fractionated to give the product.

The following 3-(lower alkoxy)-1,1,1-trifluoro-2-propanones of the formula $CF_3$—CO—$CH_2$—O—R' wherein R' is methyl, ethyl, n-propyl, isopropyl, n-butyl and isobutyl are thus prepared.

PREPARATION C

Trifluoromethyl di(lower alkyl)aminomethyl ketones (a) Trifluoromethyl dimethylaminomethyl ketone.—A solution of dimethylamine (0.6 mole of 30% aqueous solution) is treated dropwise with 3-chloro-1,1,1-trifluoro-2-propanone (0.3 mole) over a period of one hour. The mixture becomes very warm and after completion of addition, is warmed on a water-bath until the 3-chloro-1,1,1-trifluoro-2-propanone odor is gone. The mixture is then neutralized, steam distilled and the distillate concentrated on a water-bath. The concentrate is extracted with ether then treated with excess sodium hydroxide solution (30%) and extracted with ether. The ethereal extract is dried with potassium carbonate, the ether removed by distillation and the product obtained by distillation.

(b) General procedure.—To a solution of the appropriate di(lower alkyl)amine (0.4 mole) in ether (200 ml.) contained in a 3-necked flask fitted with stirrer, dropping funnel and reflux condenser, is added 3-chloro-1,1,1-trifluoro-2-propanone (0.2 mole) dropwise over a period of one hour. The mixture is then refluxed overnight, filtered and the filtrate fractionated in vacuo to give the product.

The following compounds of formula $$CF_3\text{—CO—}CH_2\text{—NR'R''}$$

are thus prepared:

| R' | R'' |
|---|---|
| $CH_3$ | $CH_3$ |
| $C_2H_5$ | $C_2H_5$ |
| $C_2H_5$ | $CH_3$ |
| n-$C_3H_7$ | n-$C_3H_7$ |
| n-$C_4H_9$ | n-$C_4H_9$ |
| i-$C_3H_7$ | i-$C_3H_7$ |

PREPARATION D 1,1,1-trifluoro-5-di(lower alkyl)amino-2-pentanones

The procedure of Breslow et al., J. Am. Chem. Soc. 68, 102 (1946), Method A, for preparing 1,1,1-trifluoro-5-di(ethyl)amino - 2 - pentanone is employed. The procedure comprises adding the appropriate β-di(lower alkyl)aminoethyl chloride (0.78 mole) to a dry benzene (350 ml.) solution of the sodium salt of ethyl trifluoroacetoacetate (0.63 mole). The mixture is heated and stirred at 50°–60° C. for three hours, allowed to stand overnight at ambient temperature, then refluxed an additional three hours. The reaction mixture is centrifuged, the benzene solution decanted and the benzene removed under reduced pressure. The residue is heated overnight in 10% sulfuric acid (800 ml.) on a steam-bath. The product is salted out with potassium carbonate, extracted with either, the ether solution dried over potassium carbonate and the ether distilled off. The residue is distilled in vacuo to give the product.

The following compounds are thus prepared $$CF_3\text{—CO—}CH_2\text{—}CH_2CH_2\text{—NR'R''}:$$

| R' | R'' |
|---|---|
| $CH_3$ | $CH_3$ |
| n-$C_3H_7$ | n-$C_3H_7$ [1] |
| n-$C_4H_9$ | n-$C_4H_9$ |

[1] Prepared from β-di(n-propyl)aminoethylbromide.

PREPARATION E

Carbethoxymethyltriphenylphosphonium bromide (0.03 mole) and benzene (250 ml.) are placed in a 500 ml. round-bottom flask under an atmosphere of nitrogen at room temperature. n-Butyl lithium (0.03 mole in 12.7 ml. hexane) is added and the mixture stirred for two hours. A solution of N-trifluoroacetylimidazole (0.015 mole) in benzene (50 ml.) is then added dropwise, the mixture stirred for 2.5 hours, then poured into water (300 ml.). The benzene layer is separated, dried (anhydrous $Na_2SO_4$), filtered and evaporated. The aqueous layer is extracted with ether, the ethereal extract dried ($Na_2SO_4$), combined with the product of the benzene extraction and the ether removed by evaporation to give the phosphorane compound.

The product is dissolved in benzene (50 ml.), zinc dust (60 g.) added and the mixture heated to reflux. Acetic acid (200 ml.) is added in small portions over a two-hour period. The mixture is refluxed an additional two hours, the benzene removed in vacuo and the residue fractionated in vacuo to give the product.

In like manner, the following compounds are prepared from the appropriate triphenylphosphonium bromide [$(C_6H_5)_3$P—$CH_2$R'']Br:

| R''=R | R''=CH(Z)$R_1$ |
|---|---|
| COO(n-$C_3H_7$) | $CH_2CONH_2$ |
| COO(n-$C_4H_9$) | $CH_2COOCH_3$ |
| COO(i-$C_3H_7$) | $CH_2$COO(n-$C_4H_9$) |

The triphenylphosphonium bromides are prepared by refluxing equimolar quantities of triphenylphosphine and the appropriate bromide ($B_2CH_2$R'') in benzene.

PREPARATION F

Diethyl methyl chloromethyl malonate (0.03 mole) and triphenylphosphine (0.03 mole) are refluxed in benzene (200 ml.) for four hours. The mixture is then cooled to room temperature and the triphenylphosphonium chloride then reacted according to the method of Preparation E. The resulting product diethyl methyl trifluoroacetonyl malonate is decarboxylated by heating at 60° C. in concentrated hydrochloric acid overnight. The acid solution is then taken to dryness under reduced pressure and the residue esterified with ethanol (or other lower alkanol) using sulfuric acid as catalyst. The product, ethyl α-methyl-β-trifluoroacetylpropionate, is recovered by vacuum distillation.

The following compounds are prepared in this manner from the appropriate lower alkyl chloromethyl diethylmalonate:

$$CF_3\text{—CO—}CH_2\text{—CH—COO—Alkyl}$$
$$|$$
$$R_1$$

| $R_1$ | COO-alkyl |
|---|---|
| $CH_3$ | $COOCH_3$ |
| $C_2H_5$ | $COOC_2H_5$ |
| n-$C_3H_7$ | $COOCH_3$ |
| $CH_3$ | COO(n-$C_4H_9$) |

The corresponding amides are prepared by heating the esters with concentrated aqueous ammonia followed by evaporation to dryness. The following amides are thus prepared:

$$CF_3\text{—CO—}CH_2\text{—CH—CONH}_2$$
$$|$$
$$R_1$$

wherein $R_1$ is $CH_3$, $C_2H_5$, n-$C_3H_7$, n-$C_4H_9$.

What is claimed is:
1. A compound selected from the group consisting of those having the formula

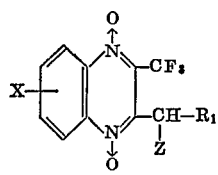

wherein X is a 6- or 7-position substituent and is selected from the group consisting of hydrogen, chloro, fluoro, methyl, methoxy, trifluoromethyl, sulfonamido, N-methylsulfonamido and N,N-dimethylsulfonamido; Z is selected from the group consisting of hydrogen, carboxy, carbo-(lower alkoxy), carbamyl, chloro, fluoro, bromo, (lower alkyl)thio, (lower alkyl)sulfinyl, (lower alkyl)sulfonyl, hydroxy, lower alkoxy, lower alkanoyloxy, amino, mono (lower alkyl)amino, di(lower alkyl)amino, trimethylammonium and nitro-oxy; $R_1$ is selected from the group consisting of hydrogen and lower alkyl; non-toxic acid addition salts of those compounds wherein Z is selected from the group consisting of amino, mono(lower alkyl)amino and di(lower alkyl)amino; and the sodium and potassium salts of those compounds wherein Z is carboxy.

2. A compound selected from the group consisting of those of the formula

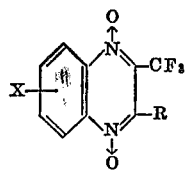

wherein X is a 6- or 7-position substituent selected from the group consisting of chloro, fluoro, methoxy, trifluoromethyl, sulfonamido, N-methylsulfonamido and N,N-dimethylsulfonamido and R is selected from the group consisting of hydrogen, carbo(lower alkoxy), carbamyl, chloro, bromo, fluoro, cyano, lower alkoxy, (lower alkyl)thio, (lower alkyl)sulfinyl, (lower alkyl)sulfonyl, amino, mono(lower alkyl)amino, di(lower alkyl)amino, $\omega,\omega,\omega$-trifluoro(lower alkyl), trifluoroacetyl, phenyl, cycloalkyl, di(lower alkyl)aminoethyl, —CO—$R_2$, formyl and

—CH=N—$R_5$ wherein $R_5$ is selected from the group consisting of

NH—CO—NH$_2$
NH—CS—NH$_2$
NH—C(NH)—NH$_2$
NH—$R_6$
NH—COOR$_7$
NH—COR$_8$
OR$_9$

 and 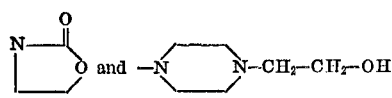

wherein
$R_6$ is selected from the group consisting of lower alkyl, benzyl and hydroxy alkyl containing from 2 to 4 carbon atoms;
$R_7$ is selected from the group consisting of lower alkyl and hydroxyalkyl containing from 2 to 4 carbon atoms;
$R_8$ is selected from the group consisting of lower alkyl and phenyl; and
$R_9$ is selected from the group consisting of hydrogen and lower alkyl;

and the non-toxic acid addition salts of those compounds wherein R is selected from the group consisting of amino, mono(lower alkyl)amino, di(lower alkyl)amino and di-lower alkyl)aminoethyl.

3. A compound of the formula

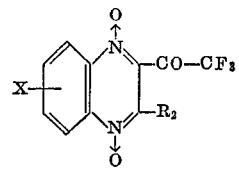

wherein X is a 6- or 7-position substituent selected from the group consisting of hydrogen, chloro, fluoro, methyl, methoxy, trifluoromethyl, sulfonamido, N-methylsulfonamido and N,N-dimethylsulfonamido and $R_2$ is selected from the group consisting of lower alkyl, phenyl, 2-furyl, 2-pyrryl, 2-thienyl, 2,5-dimethyl-3-thienyl and 5-substituted-2-thienyl wherein the substituent is selected from the group consisting of methyl, chloro, bromo and iodo.

4. The compounds of claim 2 having the formula

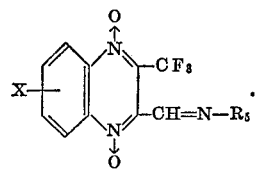

5. The compounds of claim 2 having the formula

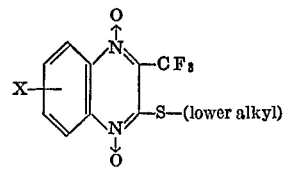

6. The compounds of claim 1 having the formula

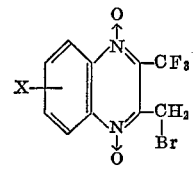

7. The compounds of claim 3 having the formula

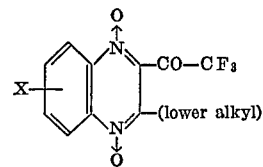

8. The compounds of claim 2 wherein R is formyl.
9. The compound of claim 1 wherein X is chloro, Z is methoxy and $R_1$ is hydrogen.
10. The compound of claim 1 wherein X is hydrogen, Z is carbamyl and $R_1$ is hydrogen.
11. The compound of claim 1 wherein X is hydrogen, Z is carbomethoxy and $R_1$ is hydrogen.
12. The compound of claim 4 wherein X is chloro and $R_5$ is —NHCOOCH$_3$.
13. The compound of claim 5 wherein (lower alkyl) is methyl.
14. The compound of claim 6 wherein X is hydrogen.

References Cited
UNITED STATES PATENTS
3,644,363   2/1972   Kim _____ 260—250 R N. S. RIZZO, Primary Examiner U.S. Cl. X.R.
260—240 G; 424—250